United States Patent [19]

Border et al.

[11] 4,375,369

[45] Mar. 1, 1983

[54] METHOD AND APPARATUS FOR CONTROLLING TEMPERATURES WITHIN A STREAM OF MOLTEN MATERIAL

[75] Inventors: Gary C. Border, Bowling Green; Richard A. Patznick, Toledo, both of Ohio

[73] Assignee: Manville Service Corporation, Denver, Colo.

[21] Appl. No.: 264,926

[22] Filed: May 18, 1981

Related U.S. Application Data

[63] Continuation of Ser. No. 124,018, Feb. 25, 1980, abandoned, which is a continuation of Ser. No. 904,730, May 11, 1978, abandoned.

[51] Int. Cl.³ .............................................. C03B 5/24
[52] U.S. Cl. .................................... 65/29; 65/162; 65/DIG. 13
[58] Field of Search ................... 65/29, 162, DIG. 13

[56] References Cited

U.S. PATENT DOCUMENTS

| | | | |
|---|---|---|---|
| 3,573,017 | 3/1971 | Griem, Jr. | 65/29 |
| 3,779,731 | 12/1973 | Pollock et al. | 65/29 |
| 4,028,083 | 6/1977 | Patznick et al. | 65/29 |

*Primary Examiner*—Arthur D. Kellogg
*Attorney, Agent, or Firm*—Ronald M. Halvorsen; John D. Lister; Richard K. Thomson

[57] ABSTRACT

A forehearth through which molten glass flows is divided into a plurality of zones. Means are provided in each zone for measuring the temperature of the molten glass and the atmospheric temperature. Means are provided for accumulating and storing data. When the temperature of the molten glass in a selected zone is not within an acceptable range a control signal is generated. The control signal is in response to the current molten glass and atmospheric temperatures in the zone, the current molten glass temperature in the immediately preceding zone and the accumulated and stored data comprising the history of the molten glass and atmospheric temperatures for the selected zone.

4 Claims, 3 Drawing Figures

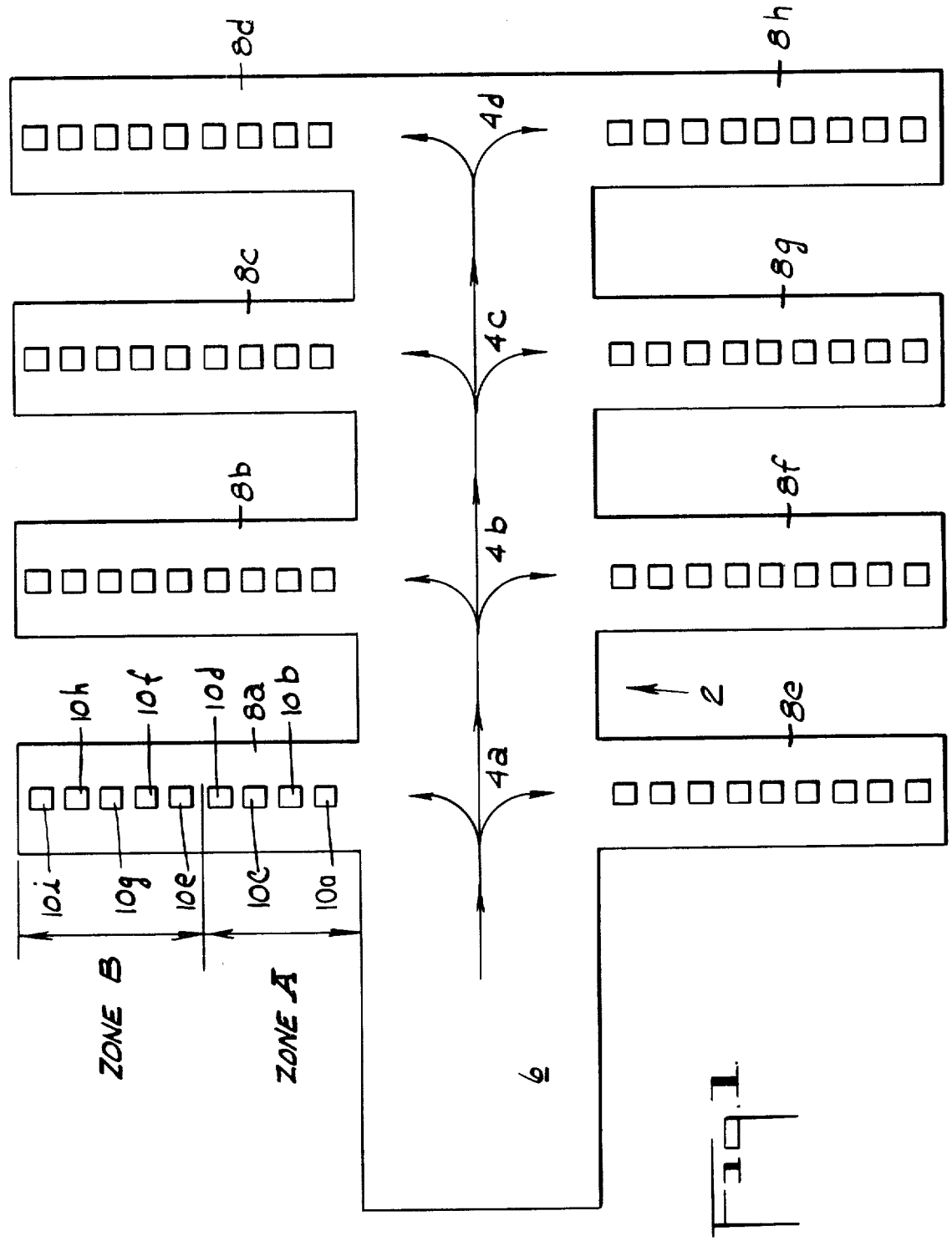

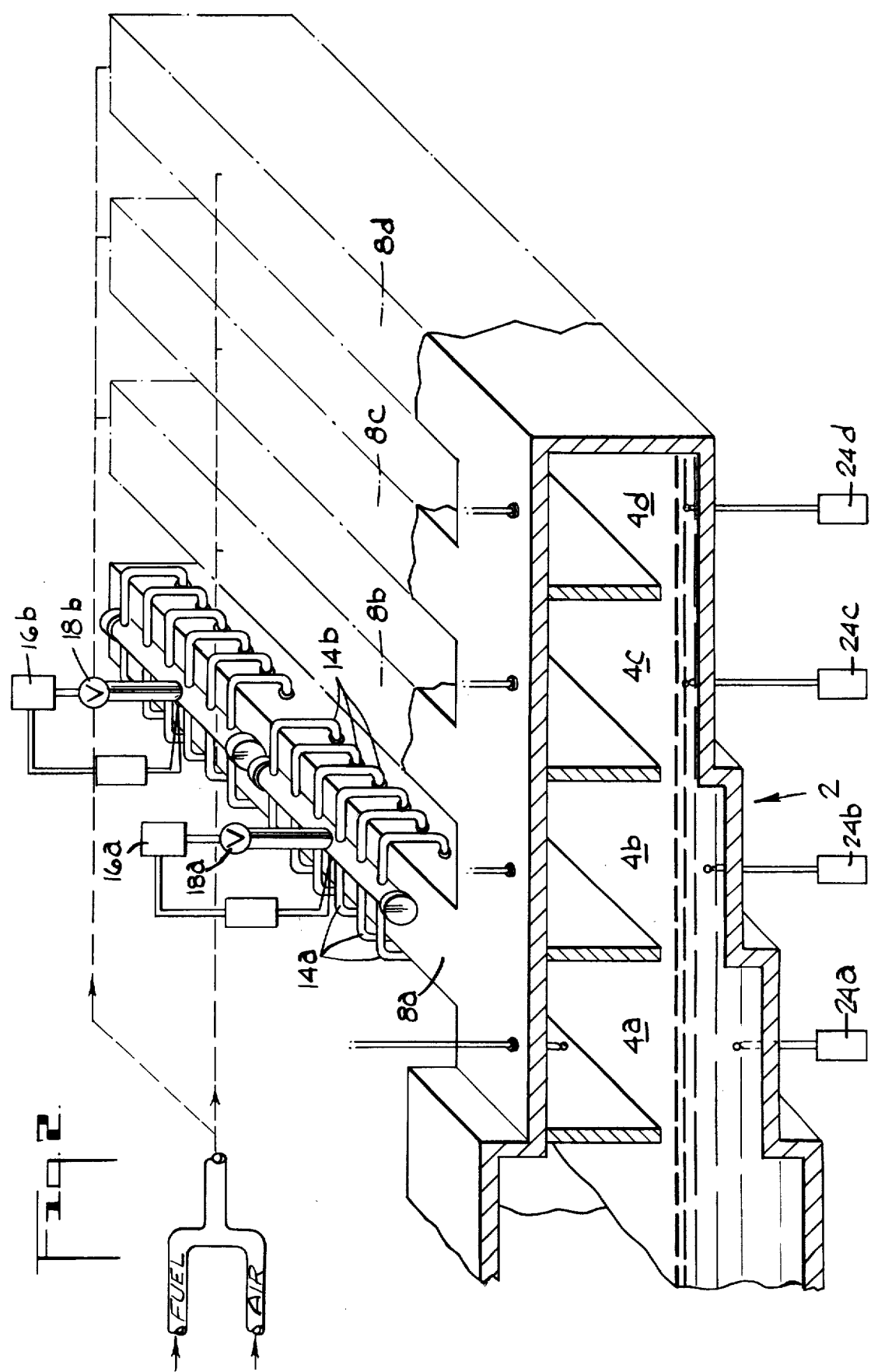

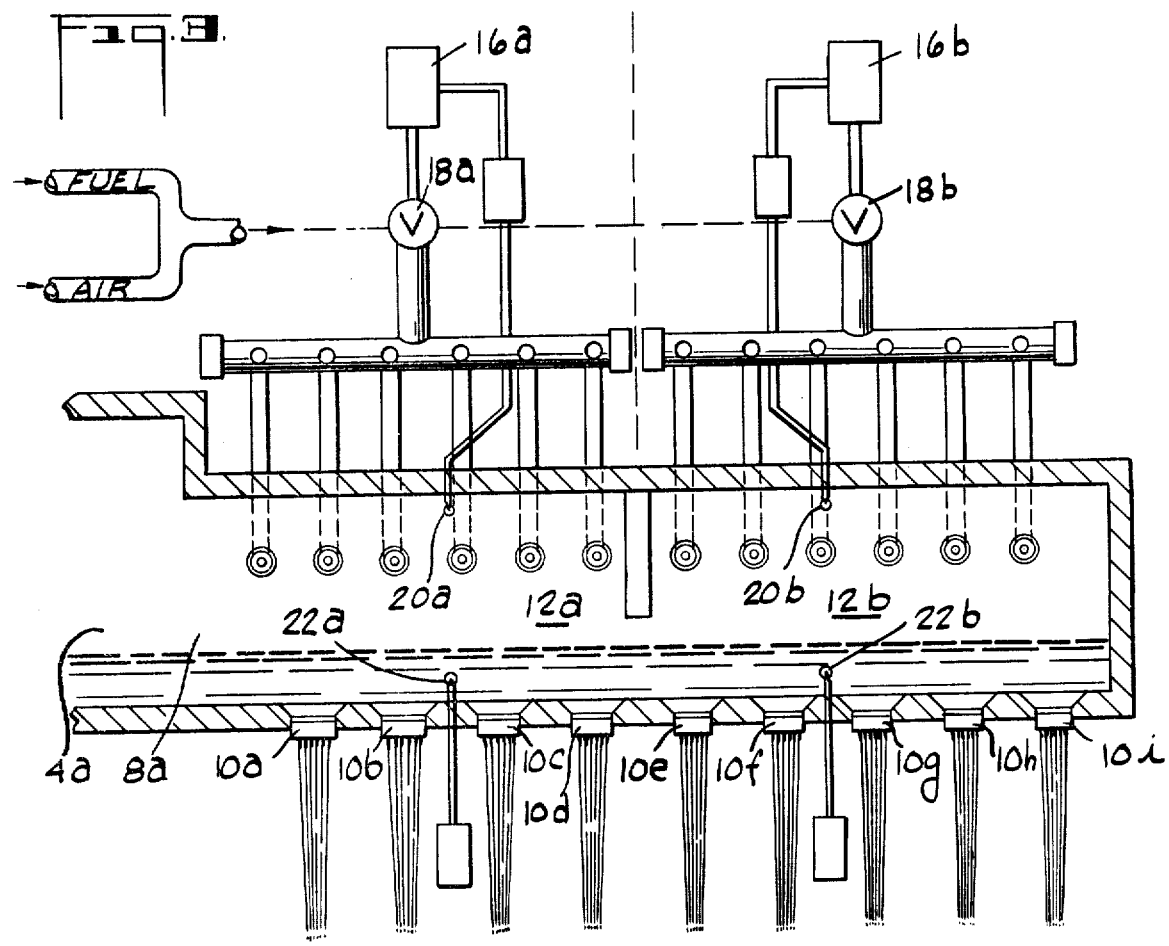

METHOD AND APPARATUS FOR CONTROLLING TEMPERATURES WITHIN A STREAM OF MOLTEN MATERIAL

This is a continuation of application Ser. No. 124,018, filed Feb. 25, 1980 which was a continuation of application Ser. No. 904,730 filed May 11, 1978 both now abandoned.

BACKGROUND OF THE INVENTION

This invention provides an improved method and apparatus for controlling temperatures within streams of molten material in furnace assemblies. In particular, this invention addresses the problem of thermal lags within the material and variations in the temperature of material entering the various sections of such molten stream. While this invention has application to many different processes, for the purpose of illustration, this control system will be described with respect to its application in the glass fiber production process.

The furnace of the glass fiber production process traditionally melts glass batch or cullet in a melting and refining tank. From the melting and refining tank, the molten glass flows into the forehearth section of the furnace. The forehearth section is comprised of numerous channels which supply streams of molten glass to one or more producing devices such as bushings or spinners. These devices attenuate the glass into staple fibers, continuous strands, or other products through conventional processes.

The quality of the glass fibers attenuated in such a process is highly dependent on proper control of the temperature of the glass stream as it passes through the channels of the forehearth to the producing devices. These forehearth channels have traditionally been divided into a number of successive heating zones, each with individual temperature sensing and heat control equipment. The molten glass enters the forehearth section at a temperature of roughly 2500° F., and should generally be delivered to the producing devices at temperatures near 2300° F. for optimal production efficiency. The degree of difficulty involved in this task is further compounded in that the geometric configuration of traditional forehearth assemblies dictate that different streams of glass must often traverse greatly different distances in the course of their normal flow from the melter and refiner exit, through the successive forehearth zones, to their respective producing assembly.

One traditional approach to forehearth temperature control assigns a single temperature regulator to each forehearth zone. This regulator responds to changes in the temperature of a single temperature transducer in the hot gases above the stream of molten glass in the forehearth channel by controlling the fuel-air supply to the burners associated with that particular forehearth section. In general, it has not proved difficult to control such an atmospheric temperature which is sensed by a single transducer in the hot exhaust gases above its associated forehearth zone. The major drawback in such a system is that it is not well adapted to control the temperatures within the molten stream of glass being conveyed to the producing devices of the forehearth. Instead, this system focuses on the control of temperatures in the hot exhaust gases which is seldom effective in adequately controlling the characteristics of the glass which affect production efficiency.

A more recent control method is one such as that disclosed in the patent to Griem Jr., U.S. Pat. No. 3,506,427, issued Apr. 14, 1970. This patent discloses a technique for compensating temperature control in forehearth zones for masses of unmelted glass batch passing through the channels of the forehearth. In this technique, each forehearth zone's temperature controller responds directly to a temperature measurement within the glass of that particular zone by adjusting the heat input of said zone to achieve a desired glass temperature. In order to dampen response of such controllers to cool masses of glass passing through the individual forehearth zones, Griem suggests that such masses be detected upon entrance to the forehearth and effectively tracked in their journey through the forehearth channels, compensating each zone's controller as its associated temperature transducer becomes affected by the cool mass. One difficulty with this technique is that this compensation consists primarily of deactivation of the control mechanism for the particular forehearth zone. Another difficulty is that no consideration has been devoted to the thermal lags which occur in the stream of molten glass between the heating mechanism and the temperature transducer.

Another system for controlling the temperature in molten glass is in U.S. Pat. No. 4,028,083 which discloses a furnace, which includes a melting and refining tank and a forehearth, is divided into a plurality of zones or regions. Each of the zones is provided with means for sensing temperature within the zone and a means for heating the zone. Means is also provided for measuring the individual heat input into the furnace of the heating means in each of the zones. When changes in temperatures are required, the temperatures in the different zones of the furnace are controlled by adjusting the heat input of the heating means in at least one of the zones to cause the temperatures in each of the zones where changes in temperature are required to approach desired temperatures. The adjustment is made in response to the last sensed temperature in a time period for each of the zones and in response to at least some of the temperatures sensed and the heat inputs measured in each of zones during that time period so as to compensate for thermal lags within the furnace and the effect of heat input in any one of the zones on the temperatures in other of the zones. However, difficulties were experienced in trying to adapt that system to forehearth control of the type disclosed in this application.

A system to control the temperatures in a forehearth must account for at least two important characteristics of the forehearth. First, there exists a thermal lag between a change in the heat input of a set of burners and changes in the temperature of the stream of molten glass in the associated forehearth zone. In addition, the temperature of the stream of glass in one zone of the forehearth will affect future temperatures in the glass streams of successive forehearth zones as the glass continues its flow to the producing devices. It is an object of the present invention to overcome the problems associated with the control techniques of the prior art by accounting for both thermal lags in the forehearth glass streams and the movement of the molten glass as it travels from the forehearth inlet through the forehearth channels to the producing devices.

In this invention, accurate control of molten glass temperatures in the streams of forehearth assemblies is achieved by dividing the forehearth into zones or regions wherein each zone is provided with a means for heating the molten glass within the zone, a means for controlling the amount of heat provided by the heating means, and a means for sensing at least one temperature in each zone. To implement the control of the molten glass temperature in a forehearth zone, the current temperature of the molten glass for such zone and the current atmospheric temperature for such zone are sensed and recorded and the current temperature of the molten glass in the immediately preceding zone is sensed. If the temperature of the molten glass in such zone is not within an acceptable range, such as 1° F., of the desired molten glass temperature, the heat input of the heating means for the corresponding forehearth zone is adjusted to cause the temperature in said zone to approach the desired molten glass setpoint temperature. This adjustment is made in response to the last sensed temperature in said zone, the history of the molten glass temperatures in such zone, the atmospheric temperature in said zone and the history of the atmospheric temperatures in such zone, and the molten glass temperature in the preceding forehearth zone so as to compensate for thermal lags within the molten streams of the forehearth assembly and the movement of the molten glass as it travels to the producing devices.

BRIEF DESCRIPTION OF THE DRAWINGS

FIG. 1 is a schematic view from the bottom of a glass melting tank, the conditioning channels and the forehearth legs;

FIG. 2 is a schematic view in cross-section of the conditioning channels; and,

FIG. 3 is a schematic view in cross-section of one of the forehearth legs.

DETAILED DESCRIPTION OF THE PREFERRED EMBODIMENTS

FIG. 1 illustrates a forehearth 2 which includes a number of conditioning channels 4a, 4b, 4c, and 4d. The moten glass is conveyed in a stream from the melter 6 to the channels and on to the forehearth legs 8a, 8b, 8c, 8d, 8e, 8f, 8g, and 8h. The forehearth legs are constructed in a manner to convey the molten stream to the producing devices 10a, 10b, 10c, 10d, 10e, 10f, 10g, 10h and 10i.

FIG. 2 is a cross-sectional breakaway pictorial of the same forehearth assembly. The glass flows through the channels 4a, 4b, 4c, and 4d to the forehearth legs 8a, 8b, etc. Each channel section is segmented as an individual heat control zone, and each forehearth leg has been arbitrarily segmented into two (2) individual heat control zones 12a and 12b. Each zone is heated by a multiplicity of gas or oil fired burners 14a and 14b. The heat input to the forehearth for each zone is controlled by conventional fuel-flow regulators 16a and 16b; e.g., remotely controlled valve control motors. These fuel-flow regulators control the fuel-air supply to each set of burners by adjusting the settlings of the supply valves 18a and 18b. Each zone is provided with at least one atmospheric temperature sensing means such as thermocouples 20a and 20b located adjacent the roof of the zone which measures the zone temperature in the hot exhaust gases above the stream of glass. Each zone is also provided with at least one temperature transducer 22a and 22b located adjacent the floor of the zone which measures the zone temperature within the stream of molten glass for that particular zone.

The regulators 16a and 16b typically regulate the amount of fuel-air supplied to the burners 14a and 14b in response to an atmospheric temperature setpoint signal and the measurement signal from thermocouples 20a and 20b. Alternately, regulators 16a and 16b may regulate the amount of fuel-air supplied to burners 14a and 14b in response to a flow setpoint singal and the measurement from flow transducers (not shown). In this latter technique, it is also possible to adjust the flow setpoint signal using a conventional BTU analyzer (e.g., an analyzer marketed under the trade name REINEKE calorimeter) in order to control the BTU or heat input into the forehearth to a desired setpoint value.

FIG. 3 presents a segmented cross-sectional view of an individual forehearth leg. The molten stream of glass enters the forehearth leg 8a from adjacent channel 4a. The forehearth leg 8a is further divided into two (2) separate control zones, 12a and 12b. A certain amount of the glass entering control zone 12a passes into the producing devices 10a, 10b, 10c, and 10d where it is attenuated into glass fibers. The remaining glass flow continues to control zone 12b where it is attenuated into glass fibers at producing devices 10e, 10f, 10g, 10h and 10i.

Although a gas or oil fired forehearth has been presented for the purpose of illustrating this invention, any number or means and methods for supplying and controlling the BTU input or heat energy input to zones can be utilized. For example, this invention would apply equally well to furnaces heated by electrodes or similar heating means.

The control system for a forehearth such as the one illustrated in FIGS. 1, 2, and 3 will be discussed in detail. It should be noted that the same control system can be used with any multi-zone forehearth assembly.

The temperature being regulated in each zone of the forehearth is affected by the BTU or heat input of the burners for that zone. It is important to note that this molten glass temperature does not respond instantaneously to changes in the heat input to the zone. Rather, there is a thermal lag associated with the response of a temperature transducer on the floor of zone to a change in the rate of heat input to that zone. In addition, the temperature within the stream of molten glass within any one zone is affected by the temperature of the molten glass entering said zone from the immediately preceding zone. In relation to the first zone 12a, the temperature of the immediately preceding zone is sensed by temperature transducer 24a in channel 4a. Similar temperature transducers 24b, 24c and 24d are located in channels 4b, 4c and 4d.

The control system of the present invention requires separate data acquisition and control means for each zone of the forehearth assembly. The data acquired for each zone consists of individual temperature measurements made by the temperature transducers 22 for both the zone itself and the immediately preceding zone and the atmospheric temperature for the particular zone. While this data can be collected continuously or at shorter intervals, the data is normally acquired every time a new control action is computed for the control system of the individual zone. The temperature of the molten glass and the atmospheric temperature for the zone are fed to a storage device for a period of time. Consequently, just prior to the generation of a new control signal, the storage device has available the current temperature of the molten glass stream in the zone, the current atmospheric temperature in the zone, the current temperature of the molten glass stream in the immediately preceding zone, and a history of the molten glass temperatures and the atmospheric temperatures over a period of time. This data is mathematically weighed to generate a control signal which is used for the atmospheric temperature set point for the individual forehearth zone. This control signal is sent to the individual regulator 16 for this particular forehearth zone. This control signal is also routed to the data storage device to become part of the historical data on the control signals for this individual forehearth zone.

The mathematical weighing of the data from the storage device for an individual forehearth zone to obtain the control signal for the setpoint for the atmospheric temperature above the molten glass in the zone is preferably accomplished according to the following mathematical relationship:

$$u_d(t) = u_0 + az(t) + b(s(t) - s_0) +$$
$$\sum_{k=1}^{n} c_k(u_d(t - ek) - u_0) + dw(t)$$
$$z(t) = z(t - e) + [s(t) - s_0]$$

where:

$u_d(t)$ is the setpoint signal for the atmospheric temperature in this particular control zone at time t $u_0$ is the nominal atmospheric temperature for this forehearth zone about which the performance of this zone has been linearized e is some contant data acquisition interval (e.g., 5 minutes)

s(t) is the temperature sensed in the molten glass stream in this forehearth zone at time t $s_0$ is the temperature in the molten glass stream of this forehearth zone about which the performance of this zone has been linearized n is an integer sufficiently large to account for the effects of thermal lags within the stream of molten glass in this zone.

$a, b, c_k$, and d are scalar variables obtained by one of several feedback control approaches. In general, these values are determined from the A and B matrices defined below.

w(t) is the differenc between the temperature of the molten glass stream in the immediately preceding zone and the desired molten glass temperature in this particular zone.

z(t) is the sum of the differences between s(t) and $s_0$ in all previous control actions.

To obtain the A and B matrices referred to above, a mathematical model which successfully accounts for thermal lags within the molten streams and the movement of molten glass toward the producing devices has been developed. The preferred linearized model of the present invention is in the form:

$$x(t+e) - x_0 = Ax(t) - Ax_0 + Bu_d(t) - Bu_0 + Cw(t)$$

where:

e is the same constant data acquisition interval defined above x(t) is a state vector (column vector) composed of the temperature sensed in the molten glass stream in this forehearth zone at time t and each of the $u_d(.)$ for the preceding n control actions $u_d(t)$ is as described above $x_0$ is a constant version of the state vector about which system performance has been linearized $u_0$ is as described previously A is a constant matrix determined from the above model. In the case when n=1, A is 2×2.

B is a constant matrix determined from the above model. In the case when n=1, B is 2×1.

C is a constant matrix determined from the above model. It will have the same order as the B matrix.

The A, B, and C matrices are selected to make historical data satisfy the above model. The determination of values for the individual elements of A, B, and C can be made from the deterministic relationships involving knowledge of the forehearth structure or from stochastic models based on historical data on forehearth performance. In general many techniques for determining these matrices are available. It is not intended to restrict this invention to any one particular technique.

Once A, B, and C are determined, these matrices are used to compute $a, b, c_k$, and d. The preferred technique of this invention is linear optimal control theory with a quadratic perfomance index, but the techniques of stabilization theory and modal control will work equally well.

The present invention is not limited to the preferred present embodiment disclosed in detail. Other known mathematical techniques can be applied to generate essentially the same control actions. Also, other variables such as production rate can be introduced into this invention for the purpose of adjusting control to compensate for changes in such variables.

What we claim is:

1. A forehearth temperature control process, said forehearth comprising a number of conditioning channels, said channels leading molten glass to a plurality of forehearth legs, said legs being segmented into a plurality of zones, wherein said process controls the temperature of molten glass as it flows through said zones, comprising:
    (a) establishing a desired molten glass temperature for a zone,
    (b) sensing the current molten glass temperature in said zone at a regular time interval,
    (c) sensing the current atmospheric temperature in said zone at said regular time interval,
    (d) sensing the current molten glass temperature in the immediately preceding zone at said regular time interval,
    (e) accumulating data in a storage device said data including all historical molten glass and atmospheric temperatures in said zone for a preselected time period which is defined as a plurality of said regular time intervals,
    (f) after each of said regular time intervals comparing the last sensed molten glass temperature for said zone with the desired molten glass temperature for said zone,
    (g) when the comparison is not within an acceptable range of said desired molten glass temperature, generating a control signal, said control signal being generated in response to inputs including said current molten glass and atmospheric temperatures in said zone, said current molten glass temperature in the immediately preceding zone and said accumulated data, each of said inputs being multiplied by a different predetermined weighting factor to produce a corresponding resultant value, said resultant values being summed to arrive at a proper magnitude for said control signal,
    (h) sending said control signal to a regulator for controlling heat input to said zones, and (i) adding said last sensed molten glass and atmospheric temperatures in said zone to said accumulated data storage device.

2. A method as defined in claim 1 wherein said control signal is determined in accordance with the relationship:

$$u_d(t) = u_O + az(t) + b(s(t) - s_O) + \sum_{k=1}^{n} c_k(u_d(t - ek) - u_O) + dw(t)$$

$$z(t) = z(t - e) + [s(t) - s_O]$$

3. Apparatus for controlling the temperature of molten glass in a forehearth, said forehearth comprising a number of conditioning channels, said channels leading molten glass to a plurality of forehearth legs, said legs being segmented into a plurality of zones, said temperature control apparatus comprising:
   (a) means for sensing the current molten glass temperature in a zone at a regular time interval,
   (b) means for sensing the current atmospheric temperature in said zone at said regular time interval,
   (c) means for sensing the current molten glass temperature in the immediately preceding zone at said regular time interval,
   (d) means for accumulating and storing data which includes all historical molten glass and atmospheric temperatures in said zone for a preselected time period that is defined by a plurality of said regular time intervals,
   (e) means for comparing at the end of each of said regular time intervals said last sensed current molten glass temperature with a desired molten glass temperature for said zone,
   (f) means for generating a control signal in response to inputs including said current molten glass and atmospheric temperatures in said zone, said current molten glass temperature in said immediately preceding zone and said accumulated and stored data when said last sensed current molten glass temperature is not within an acceptable range of said desired molten glass temperature, each of said inputs being multiplied by a different predetermined weighting factor to produce a corrresponding resultant value, said resultant values being summed to arrive at a proper magnitude for said control signal,
   (g) means for sending said control signal to a regulator for adding heat to said zone, and
   (h) means for adding said last sensed molten glass and atmospheric temperatures in said zone to said accumulated and stored data.

4. Apparatus as defined in claim 2 wherein said control signal is in accordance with the relationship:

$$u_d(t) = u_O = az(t) + b(s(t) - s_O + \sum_{k=1}^{n} c_k(u_d(t - ek) - u_o) + dw(t)$$

$$z(t) = z(t - e) + [s(t) - s_O]$$

* * * * *